United States Patent [19]

Pollman

[11] 4,341,131

[45] Jul. 27, 1982

[54] HYDROMECHANICAL TRANSMISSIONS

[75] Inventor: Frederic W. Pollman, Ames, Iowa

[73] Assignee: Sundstrand Corporation, Rockford, Ill.

[21] Appl. No.: 134,614

[22] Filed: Mar. 27, 1980

Related U.S. Application Data

[62] Division of Ser. No. 825,844, Aug. 18, 1977, abandoned.

[51] Int. Cl.$^3$ ................. F16H 47/04; F16H 37/06
[52] U.S. Cl. .................................. 74/687; 74/682
[58] Field of Search ................. 74/687, 688, 682; 60/445, 487

[56] References Cited

U.S. PATENT DOCUMENTS

| | | | |
|---|---|---|---|
| Re. 27,307 | 3/1972 | De Lalio | 74/687 |
| 2,580,946 | 1/1952 | Orshansky, Jr. et al. | 74/687 |
| 2,599,814 | 6/1952 | Cull | 74/687 |
| 3,095,757 | 7/1963 | Thoma | 74/687 |
| 3,122,025 | 2/1964 | Mark et al. | 74/11 |
| 3,184,913 | 5/1965 | Anderson et al. | 74/687 |
| 3,212,358 | 10/1965 | De Lalio | 74/687 |
| 3,238,816 | 3/1966 | Schottler | 74/690 |
| 3,251,243 | 5/1966 | Kress | 74/689 |
| 3,255,643 | 6/1966 | Hause | 74/695 |
| 3,383,952 | 5/1968 | Christenson | 74/720.5 |
| 3,427,899 | 2/1969 | Gunderson et al. | 74/687 |
| 3,433,095 | 3/1969 | Tuck | 74/687 |
| 3,486,398 | 12/1969 | Waclawek | 74/688 |
| 3,667,321 | 8/1969 | Maurice | 74/687 |
| 3,688,600 | 9/1972 | Leonard | 74/688 |
| 3,709,060 | 1/1973 | Orshansky, Jr. | 74/687 |
| 3,709,061 | 1/1973 | Orshansky, Jr. | 74/687 |
| 3,714,845 | 2/1973 | Mooney, Jr. | 74/687 |
| 3,733,931 | 5/1973 | Nyman et al. | 74/687 |
| 3,783,711 | 1/1974 | Orshansky, Jr. | 74/687 |
| 3,786,696 | 1/1974 | Aleem | 74/687 |
| 3,835,732 | 9/1974 | Mori et al. | 74/688 |
| 3,855,879 | 12/1974 | De Lalio | 74/687 |
| 3,897,697 | 8/1975 | Chambers et al. | 74/682 |
| 3,969,957 | 7/1976 | De Lalio | 74/687 |
| 3,979,972 | 9/1976 | Sakai | 74/687 |
| 4,168,637 | 9/1979 | Orshansky, Jr. et al. | 74/687 |

FOREIGN PATENT DOCUMENTS

| | | | |
|---|---|---|---|
| 1036066 | 8/1958 | Fed. Rep. of Germany | 74/688 |
| 1238612 | 7/1971 | United Kingdom . | |
| 1265223 | 3/1972 | United Kingdom . | |
| 1318943 | 5/1973 | United Kingdom . | |
| 1364962 | 8/1974 | United Kingdom . | |
| 1423125 | 1/1976 | United Kingdom . | |
| 1563698 | 3/1980 | United Kingdom | 74/687 |

OTHER PUBLICATIONS

Quarterly Progress Report by Orshansky Transmission Corporation, Feb. 28, 1977.

Primary Examiner—Leslie Braun
Attorney, Agent, or Firm—Wegner, McCord, Wood & Dalton

[57] ABSTRACT

A three-mode, hydromechanical transmission including a pair of hydraulic displacement units forming a hydrostatic transmission and having a first, low-speed hydrostatic mode and a second and third intermediate and high speed hydromechanical modes. In one embodiment, a pair of planetary gear sets are related to form a four-element differential and are associated with an input shaft and the hydrostatic transmission and brake and clutch means. The hydrostatic transmission drives an output shaft through a connection to one of the planetary gear sets, with the brake means engaged. A first clutch means in a drive train from the input shaft to one planetary gear set effects the second mode of operation with the brake disengaged and a second clutch means in a parallel drive train to another element of the planetary gear sets effects the third mode of operation, with the brake and first clutch means disengaged. In another embodiment, three planetary gear sets are utilized to provide the same three modes of operation, with an extended third mode and with the brake means connected to an element in at least two of the planetary gear sets and with one of said drive trains also being connected to an element in more than one of the planetary gear sets.

6 Claims, 15 Drawing Figures

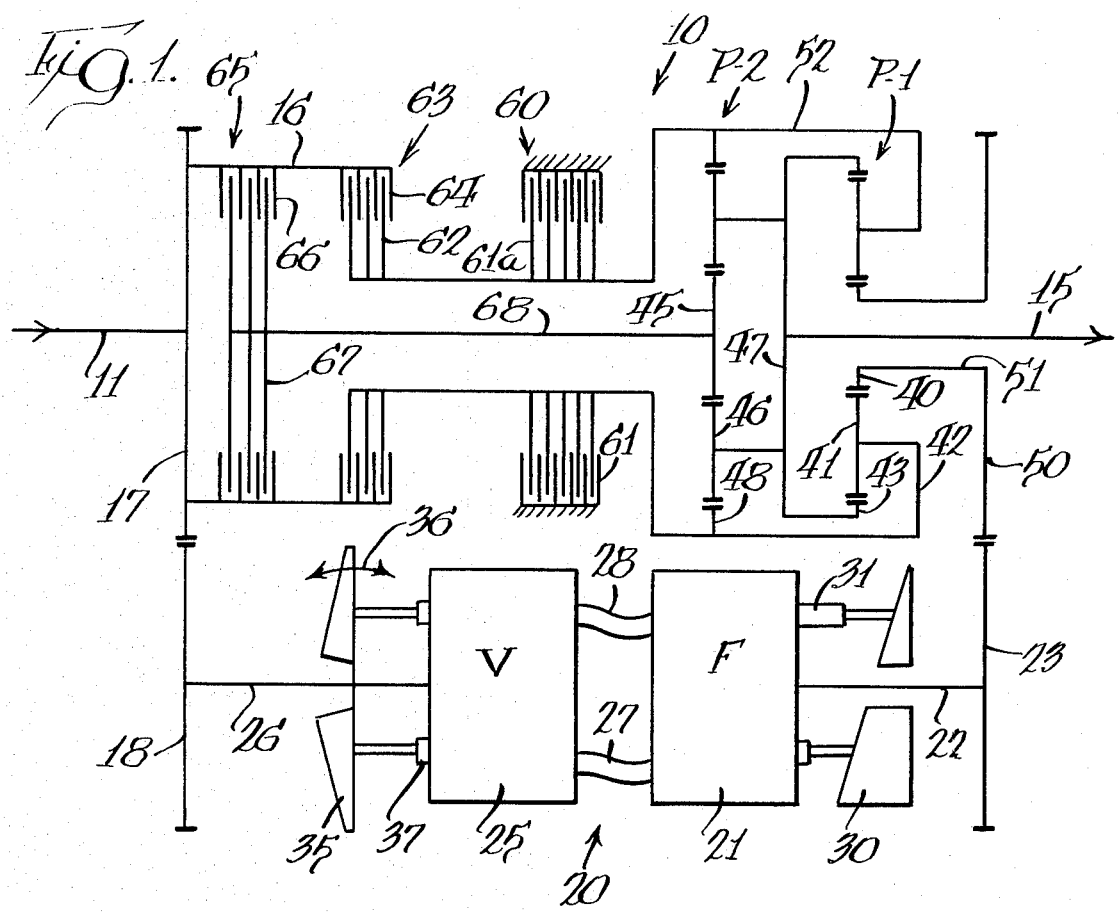
Fig. 1.
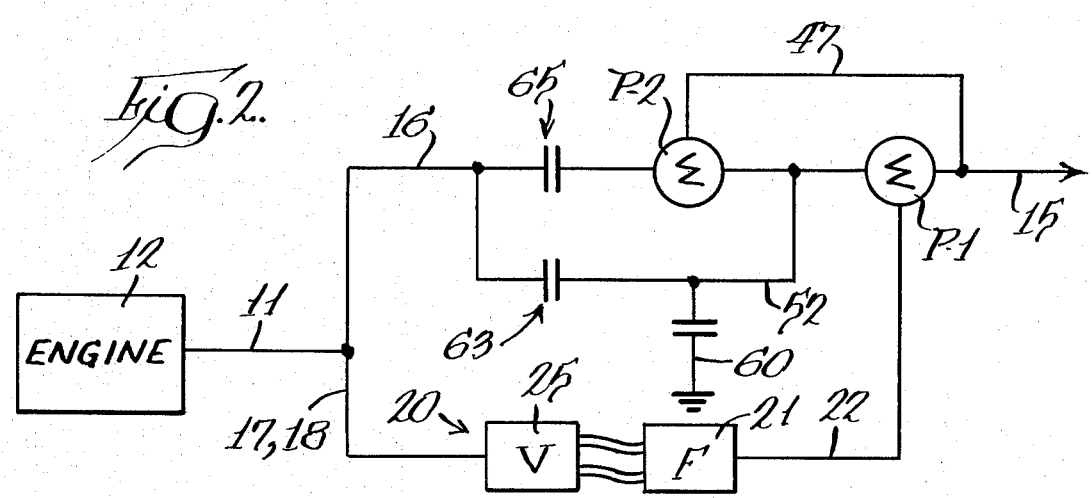
Fig. 2.
Fig. 2A.
| | ENGAGED CLUTCH | | |
|---|---|---|---|
| MODE | 60 | 65 | 63 |
| REV | ▨ | | |
| I | ▨ | | |
| II | | ▨ | |
| III | | | ▨ |

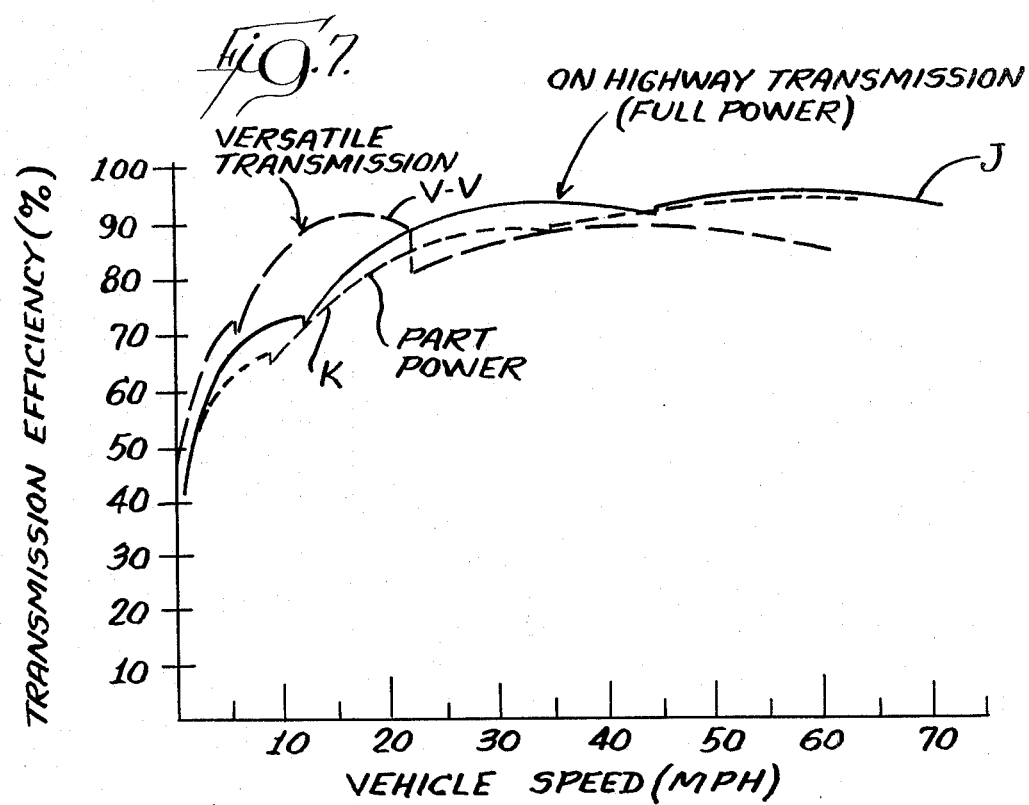
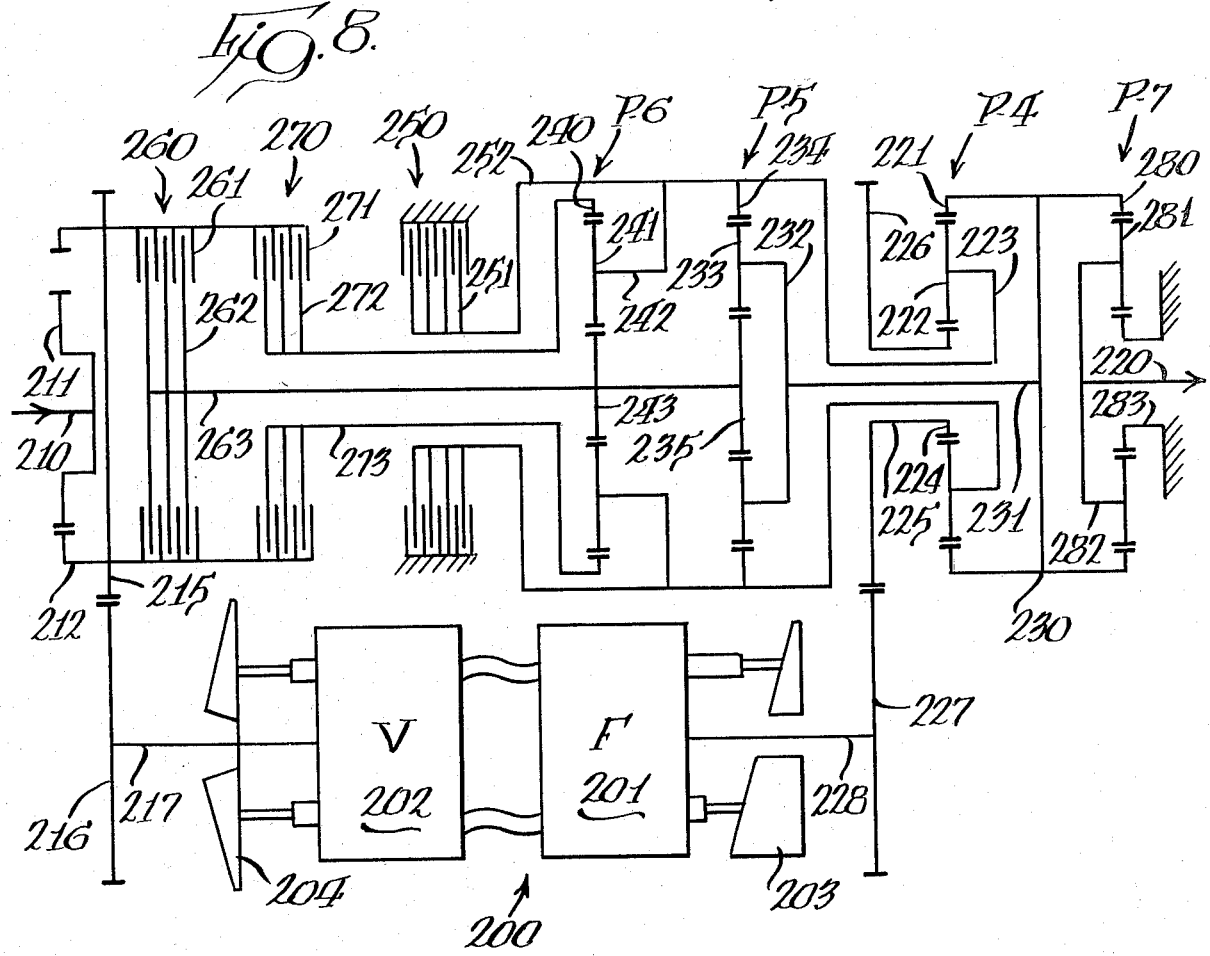

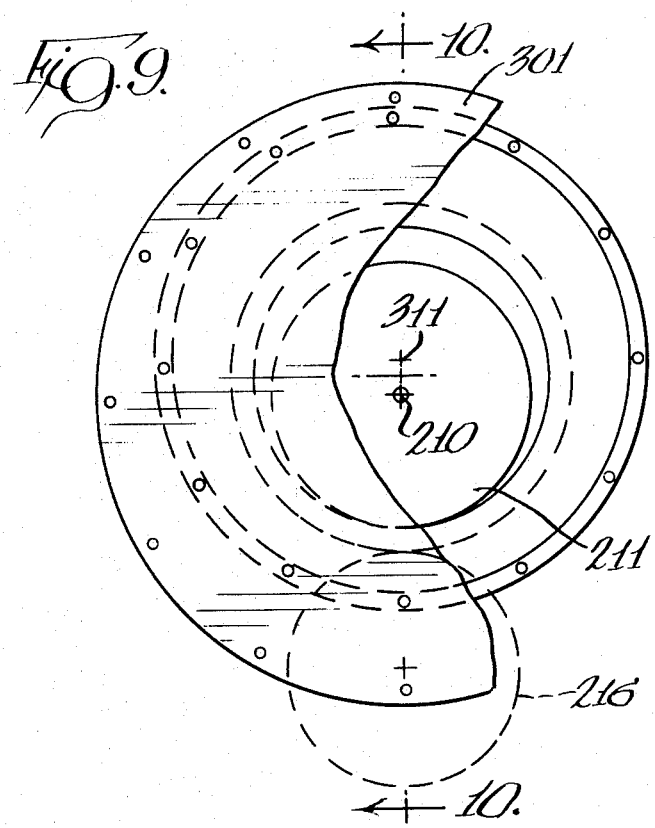
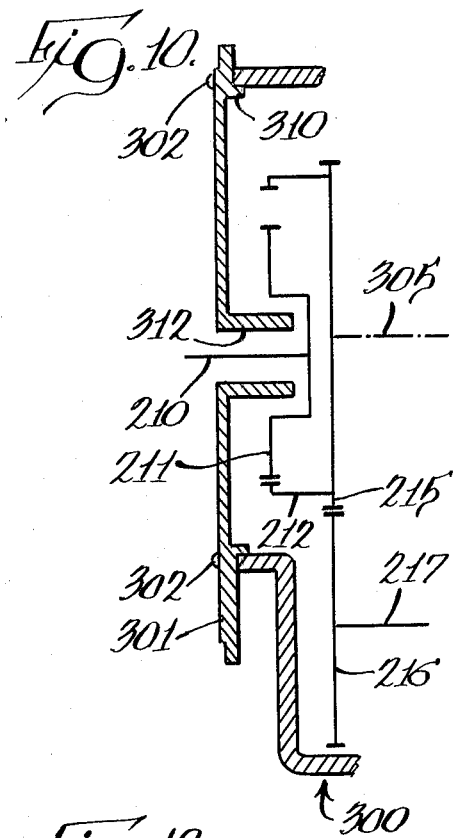
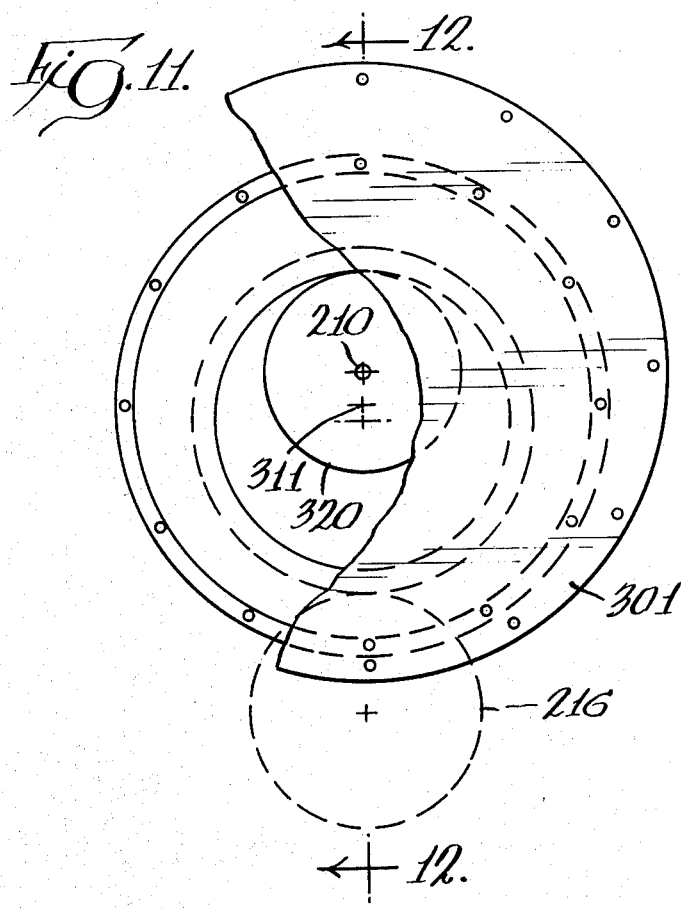
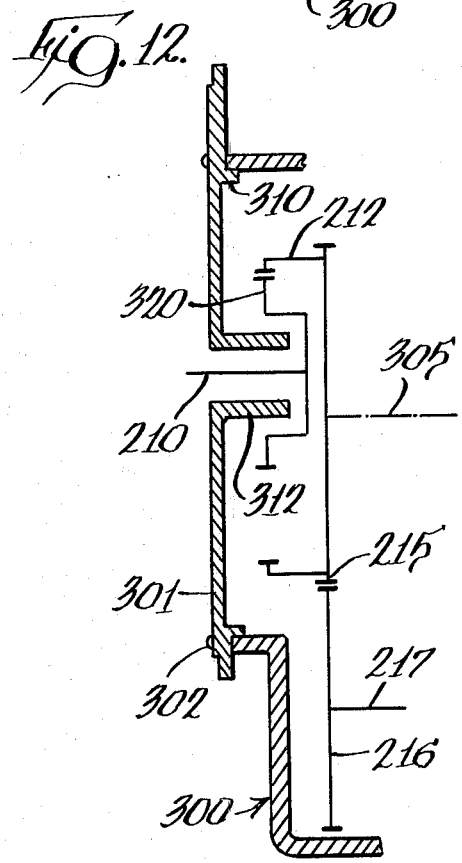

HYDROMECHANICAL TRANSMISSIONS

This is a division, of application Ser. No. 825,844 filed Aug. 18, 1977 now abandoned.

BACKGROUND OF THE INVENTION

This invention pertains to hydromechanical transmissions utilizing both mechanical and hydrostatic drives which are connectable to elements of a plurality of planetary gear sets for plural modes of operation and with clutch and brake means operable with the structure in different relations to provide the plural modes of operation.

Hydromechanical transmissions have the potential to provide increased economy and productivity when used with vehicles, such as line haul trucks of the trucking industry. However, in the past, hydromechanical transmissions have had some undesirable characteristics as compared to a standard gear transmission which normally cruises in a locked, straight-through drive and exhibits high efficiency and long life because few parts are subject to wear and fatigue. The hydromechanical transmissions have had large amounts of power transmitted through several gear meshes and through the hydrostatic units which has resulted in loss of efficiency and loss of long operating life and reliability. Additionally, there have been parasitic power losses, due to auxiliary pumps and clutch and gear spinning losses, as well as an inability to operate at an "overdrive" speed ratio at normal cruise conditions, so that engine speed can be reduced to its maximum economy range, while still retaining normal drive line components. Further, present hydromechanical transmissions can exhibit less than ideal mode shift characteristics, due to problems associated with hydrostatic unit volumetric efficiency.

In applying the hydromechanical transmission to vehicles other than line haul trucks, such as transit mixers, buses, dump trucks or refuse haulers, there are a wide variety of operational requirements and, in such an environment, a hydromechanical transmission has been subject to some disadvantages when compared with conventional shifting transmissions. Normally, there have been fixed values for input speed, output speed, and maximum output torque, while, in manual gear transmission, a wide range of input speed can be accepted, with change of relative speed and torque ratios in both low and high gear ratios. Additionally, use of hydromechanical transmissions in the last-mentioned type of vehicle, results in the hydrostatic transmission working at high pressure when operating at low ground speed, with resulting lower efficiency of the hydraulic units, which results in power loss, increased cooling requirements and more noise generation. Also, an unusually high number of vehicle starts at high pressure can reduce the life of the hydrostatic units.

A number of prior art patents relate to hydromechanical transmissions. The patents show: a two-mode transmission utilizing two planetary gear sets and a clutch and a brake; hydromechanical transmissions which have had their components in-line; a three-mode transmission using one planetary gear set with plural clutch and brake means; and a three-mode transmission having at least two planetary gear sets with three modes and plural clutch and brake means. This patent art does not disclose the features and objects of this invention, as set forth hereinafter.

An application of George A. Schauer, owned by the assignee of this application, entitled A PLURAL MODE HYDROMECHANICAL TRANSMISSION WITH SYNCHRONOUS SHIFT, Ser. No. 21,401, filed Aug. 1, 1977, now abandoned, discloses a four-element planetary gear system used in a three-mode hydromechanical transmission with synchronous shift between modes and selective drive of a sun gear.

SUMMARY OF THE INVENTION

A primary feature of the invention disclosed herein is to provide a hydromechanical transmission for optimizing economy of operation by enabling the use of a narrow speed range prime mover, such as an internal combustion engine, along with control of the engine on the locus of minimum fuel consumption, based on power demand and engine operational characteristics, and with the ability for increased productivity from the hydromechanical transmission because maximum engine speed and, consequently, maximum power can be achieved at any road speed.

Further, reducing engine speed requirements permits a better engine turbo-charger match with increased engine efficiency and also results in less parasitic loss from engine churning and friction and from engine auxiliary equipment, such as oil and water pumps. Lower maximum engine speed also insures that operation in areas of high fuel consumption will not occur under any conditions of operation.

The infinitely variable transmission replaces discrete gear ratios with a continuum of ratios to insure that the correct ratio will always be available for the appropriate speed and power requirement. This is particularly important on roads having varied grades as engine speed at maximum economy is normally lower than engine speed at maximum power. If maximum economy and productivity are to be achieved, then frequent changes in engine speed, but not vehicle speed, must be accomplished.

In furtherance of the foregoing, an object of the invention is to provide a planetary gear assembly with planetary gear sets arranged as a three-mode, synchronous shift device, wherein shifts between modes of operation, either hydrostatic or hydromechanical, allow a continuous transmission ratio before and after shift, with equal working pressure in the units of the hydrostatic transmission before and after shift and with equal speed differences between the two hydraulic units of the hydrostatic transmission before and after shift. The equal speed differences before and after shift enables a shift without requiring movement of a displacement controlling swash plate of one of the units which would normally result in a momentary loss of power flow through the transmission which can give the sensation of rough shifting and vehicle lurch.

With the transmission being a three-mode device and because of equal swash plate angle shifting, the size of the hydraulic units of the hydrostatic transmission can remain small in relation to the horsepower being transmitted. Smaller hydraulics require smaller auxiliary charge and cooling pumps and results in smaller hydraulic unit losses.

Still another object of the invention is to provide a hydromechanical transmission which minimizes the number of mechanical components transmitting power, the amount of power transmitted through the hydraulic units, and the amount of parasitic power loss which normally result from clutch and gear spinning when said last-mentioned elements are not actively operating.

A further object of the invention is to provide an inline three mode hydromechanical transmission wherein the input and output shafts are in coaxial relation along with a hydrostatic transmission and clutch and brake means also coaxial with the input and output shafts and with their being connections of said shafts to planetary gear means including an outer shaft surrounding said input shaft and connected to a unit of the hydrostatic transmission, a first mode is caused by operation of the brake means associated with an element of the planetary gear means and second and third modes of operation are carried out by connection of the input shaft to two different elements of the planetary gear means through operation of one or the other of a pair of clutches and with the planetary gear means being structurally related to provide gear ratios whereby the components to be clutched by operation of said clutches are at equal speed when a clutch is engaged.

Additional objects of the invention are to provide a hydromechanical transmission as defined in the preceeding paragraph wherein the planetary gear means is a four element differential in function provided by two planetary gear sets with the clutches and brake being grouped together and the planetary gear means grouped together to form a compact construction with a minimum number of components for three modes of operations and with only one of the planetary gear sets being used in the first and third modes.

In furtherance of the foregoing, in the mode of operation for cruise speed of a vehicle having the transmission, the efficiency of the hydromechanical transmission can approximate that obtainable with a standard gear transmission, with this resulting from a few number of components transmitting only a small fraction of engine horsepower, with resulting high durability and reliability, with the continuing capability for immediate ratio change should it be required by road conditions or driver demand.

Another object of the invention is to provide an embodiment of hydromechanical transmission usable for vehicles requiring higher output torque and having extended operation at high output torque and high horsepower levels as well as increased frequency of starting cycles wherein three planetary gear sets are interrelated with clutch and brake means to provide three modes of operation as a five-element summer in function and with an extended third mode of operation wherein the hydrostatic transmission operates over a greater speed range. This provides an increased over-all torque ratio spread to provide a greater maximum torque at start-up for increased vehicle tractive effort.

Features of the last-mentioned embodiment include the improved efficiency operations resulting from the extended third mode, wherein the undesirable high pressure and low efficiency operations are moved to a vehicle speed low enough as to render them unimportant for loss of power or heat rejection considerations. Additionally, the increased torque ratio spread adds versatility to the transmission, such as when used with a city bus having a large number of vehicle starts, since the transmission operates at a reduced staring pressure, with resulting extension of transmission life. Even if pressures were not reduced, the starting life would be increased because accumulated time at high pressure is reduced due to the shorter time for the vehicle to accelerate out of the high pressure speed zone.

An added feature of the last-mentioned embodiment is the operation at reduced noise levels because of the extended third mode of operation, since it is possible to reduce the rated speed of all the transmission components at the same rated engine speed and still obtain a normal torque ratio spread thereby reducing transmission noise.

Still another feature of the invention is to provide a hydromechanical transmission wherein the gearing provides for use at various rated engine speeds while still retaining the rated speeds of the hydraulic displacement units of the hydrostatic transmission by the change of a single input gear to the transmission and with an adjustable mounting to provide a different centerline of rotation, dependent upon the size of the interchangeable gear.

BRIEF DESCRIPTION OF THE DRAWINGS

FIG. 1 is a schematic stick diagram of a first embodiment of the invention;

FIG. 2 is a diagrammatic view of the hydromechanical transmission shown in FIG. 1;

FIG. 2A is a clutch engagement diagram;

FIG. 7 is a graph of the hydromechanical transmission efficiency with respect to vehicle speed;

FIG. 8 is a schematic stick diagram of a third embodiment of the invention having an extended third mode of operation;

FIG. 9 is a fragmentary end elevational view of a part of the transmission housing and associated structure for the embodiment of FIG. 8, with parts broken away;

FIG. 10 is a vertical section, taken generally along the line 10—10 in FIG. 9;

FIG. 11 is a view, similar to FIG. 9, showing the structure having a different diameter input gear;

FIG. 12 is a vertical section, taken generally along the line 12—12 in FIG. 11;

DESCRIPTION OF THE PREFERRED EMBODIMENTS

Figure 3:
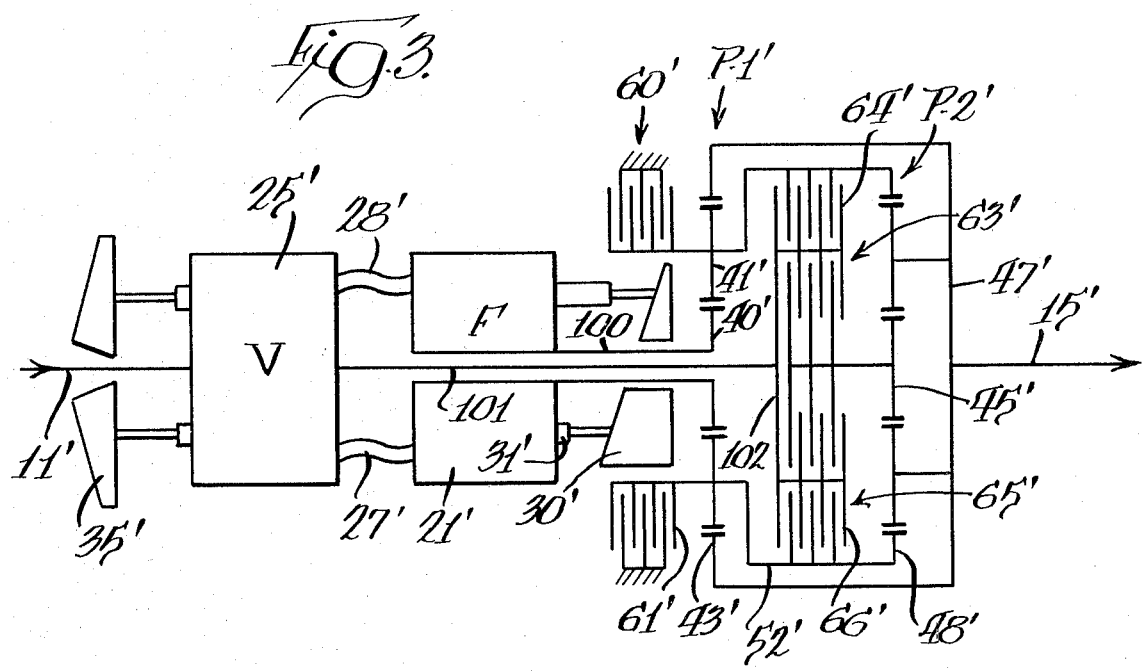
FIG. 3 is a schematic stick diagram of an in-line version of the embodiment shown in FIG. 1.

A first embodiment of the invention is shown in FIGS. 1 and 2 wherein the hydromechanical transmission, indicated generally at 10 and sometimes identified as the "on highway" transmission, has an input shaft 11 connectable to a prime mover, such as an engine 12. An output shaft 15 is connectable to the drive wheels of a vehicle to be powered by the transmission, such as a line haul truck.

The hydromechanical transmission includes a mechanical power path with a clutch sleeve 16 driven from the input shaft 11 and carrying a gear 17 which meshes with a gear 18 for driving an offset hydraulic log in the form of the hydrostatic transmission, indicated generally at 20. The hydrostatic transmission includes a pair of hydraulic displacement units with there being a fixed displacement unit 21 having a shaft 22 carrying a gear 23. A variable displacement unit 25 is connected to a shaft 26 carrying the gear 18.

The hydraulic displacement units of the hydrostatic transmission are preferably axial piston units which are interconnected by hydraulic lines 27 and 28 and, as well known in the art, have auxiliary circuitry associated therewith to provide a complete hydrostatic transmission. The hydraulic displacement unit 21 is identified as a fixed displacement unit by the legend F and has a swash plate 30 with a fixed angle surface to control the stroke of an annular array of reciprocable pistons 31 carried in a rotatable cylinder block drivingly connected to the shaft 22. The hydraulic displacement unit 25 is a variable displacement unit, as indicated by the legend V, and has a movable swash plate 35 associated therewith which can move in either direction from the neutral position shown, as indicated by the arrow 36, to control the displacement of the fluid from the variable displacement unit, as well as the direction thereof. The swash plate controls the stroke of an annular array of pistons 37 reciprocable in a cylinder block and connected to the shaft 26.

The hydromechanical transmission has a pair of planetary gear sets P-1 and P-2 arranged in tandem to provide a four-element compound in function. Each of the planetary gear sets is a planetary gear assembly having a sun gear, a ring gear and a carrier with planet gears. The planetary gear set P-1 has a sun gear 40 which meshes with planet gears 41 on a carrier 42 and a ring gear 43 having internal teeth which mesh with the planet gears 41.

The planetary gear set P-2 has a sun gear 45 with external teeth meshing with planet gears 46 carried by a carrier 47 and a ring gear 48 with internal teeth meshing with planet gears 46.

The planetary gear set P-2 has the carrier 47 thereof connected to the output shaft 15. The sun gear 40 is operatively connected to the shaft 22 of the hydrostatic transmission by gearing including the gear 23 and a meshing gear 50 connected to the sun gear 40 by a connecting tubular member 51. The carrier 42 of the planetary gear set P-1 is connected by a tubular member 52 to the ring gear 48 of the planetary gear set P-2. An additional interconnection between the planetary gear sets includes a connection between the carrier 47 of planetary gear set P-2 to the ring gear 43 of the planetary gear set P-1.

A plurality of selectively operable elements in the form of brake means and clutch means are provided for selecting the various modes of operation. These means include a brake, indicated generally at 60, with a clutch having fixed plates 61 interfitted with plates 61a connected to the tubular member 52. Tubular member 52 also carries clutch plates 62 of a clutch, indicated generally at 63, with the clutch sleeve 16 carrying the interfitted clutch plates 64. A second clutch, indicated generally at 65, carries clutch plates 66 which interfit with clutch plates 67 carried on a shaft 68 which is connected to the sun gear 45 of the planetary P-2.

The hydromechanical transmission provides a continuously variable power transmission with three modes of operation including a hydrostatic low-speed mode (mode I), with the brake means 60 energized and with the selectively operable clutches 63 and 65 disengaged.

An intermediate speed hydromechanical mode (mode II) is provided by disengagement of the selectively operable brake means 60 with engagement of the clutch 65 while the clutch 73 remains disengaged. A higher speed third mode (mode III) of operation is accomplished with the clutch 63 engaged and with the brake means 60 and clutch means 65 disengaged.

Figure 5:
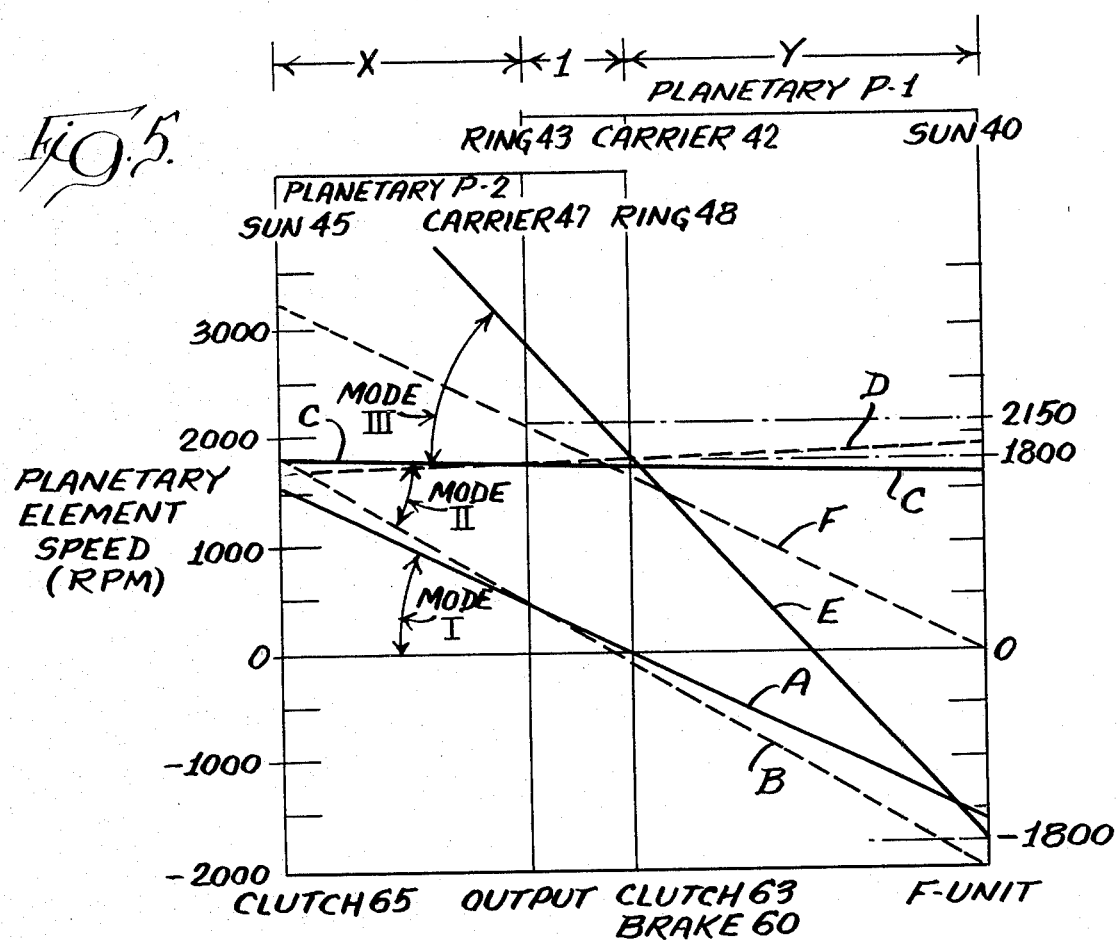
FIG. 5 is a planetary speed diagram for the hydromechanical transmissions shown in FIGS. 1 and 3.

The planetary gear set speed diagram of FIG. 5 is of assistance in understanding operation of the transmission, with the vertical scale being element speed and the horizontal scale being gear ratio. For any planetary gear system, if the speed of any two elements is known then the speed of the remaining elements can be determined by passing a straight line through the known speeds and reading the unknown speeds. The diagram shown in FIG. 5 represents the transmission of FIGS. 1 and 3 as associated with an 1800 r.p.m. engine for illustrative purposes. The vehicle is started from rest by engaging the clutch for the brake means 60 and stroking the variable displacement unit 25 to produce negative rotation of the hydraulic displacement unit 21. In this operation, carrier 42 is locked and ring 43 is the output and the planetary gear set P-1 acts as a speed reduction unit with opposite rotation which produces a positive output speed moving the vehicle forward. With the swash plate 35 of the variable displacement unit 25 being movable over center, there can be reverse direction of operation in the first mode resulting from stroking the swash plate in the opposite direction.

When the swash plate 35 reaches a position for full piston stroke, it is ideally at an angle equal to the swash plate angle for the swash plate 30 of the fixed displacement hydraulic unit 21. At this time, the variable hydraulic unit 25 is acting as a pump and the fixed displacement unit 21 as a motor, so that the leakage of hydraulic fluid results in the fixed displacement unit 21 running slower than the variable displacement unit 25. The speed of the various elements just prior to shift between modes I and II is shown by line A of FIG. 5. The speed of the fixed displacement unit 21 is represented by the speed of sun 40 which is drivingly connected thereto and the speed of the variable displacement unit is at the speed of the prime mover. It will be seen that sun 40 is rotating at a speed approximately 270 r.p.m. less than 1800 r.p.m. which is approximately 15% less than the variable displacement unit 25 which is driven by the prime mover 12. Clutch 65 which is connected to the sun gear 45 of planetary gear set P-2, is also rotating at a speed approximately 270 r.p.m. less than 1800 r.p.m. which is approximately 15% slow. The amount that clutch 65 rotates slow is determined by the planetary ratio of sun 40 to carrier 42 of planetary gear set P-1 and by carrier 42 of planetary gear set P-1 to sun 45 of planetary gear set P-2.

As the clutch 65 is engaged and the brake 60 is disengaged, there is an unequal speed condition which will cause a speed adjustment of two of the planetary gear system elements. Since ring 43 is output-connected and sun 45 is engine-connected, they have substantially greater inertia than either carrier 42 or sun 40 of planetary gear set P-1 which is connected to the fixed displacement hydraulic unit and, thus, the fixed displacement unit 21 will further increase in speed in a negative direction after clutch 65 is engaged to a speed approximately 15% faster than the variable displacement unit 25, namely, 2070 r.p.m. This pivots line A about the pivot point defined by the ring 43 to a position represented by a dotted line B. This change in speed is indicated by the lower end of the dotted line B in FIG. 5. This speed increment is determined by the ratio of sun 45 of planetary gear set P-2 to the ring 43 of planetary gear set P-1 and of ring 43 to sun 40 of planetary gear set P-1. After this shift from mode I to mode II, the fixed displacement unit 21 acts as a pump and the variable displacement unit 25 as a motor which may be determined by observing that the direction of rotation is not changed but the direction of torque has changed. The hydraulic leakage is now made up by the fixed displacement unit 21 operating at a greater speed than the variable displacement unit 25 whereby the angle of swash plate 35 need not change.

Figure 6:
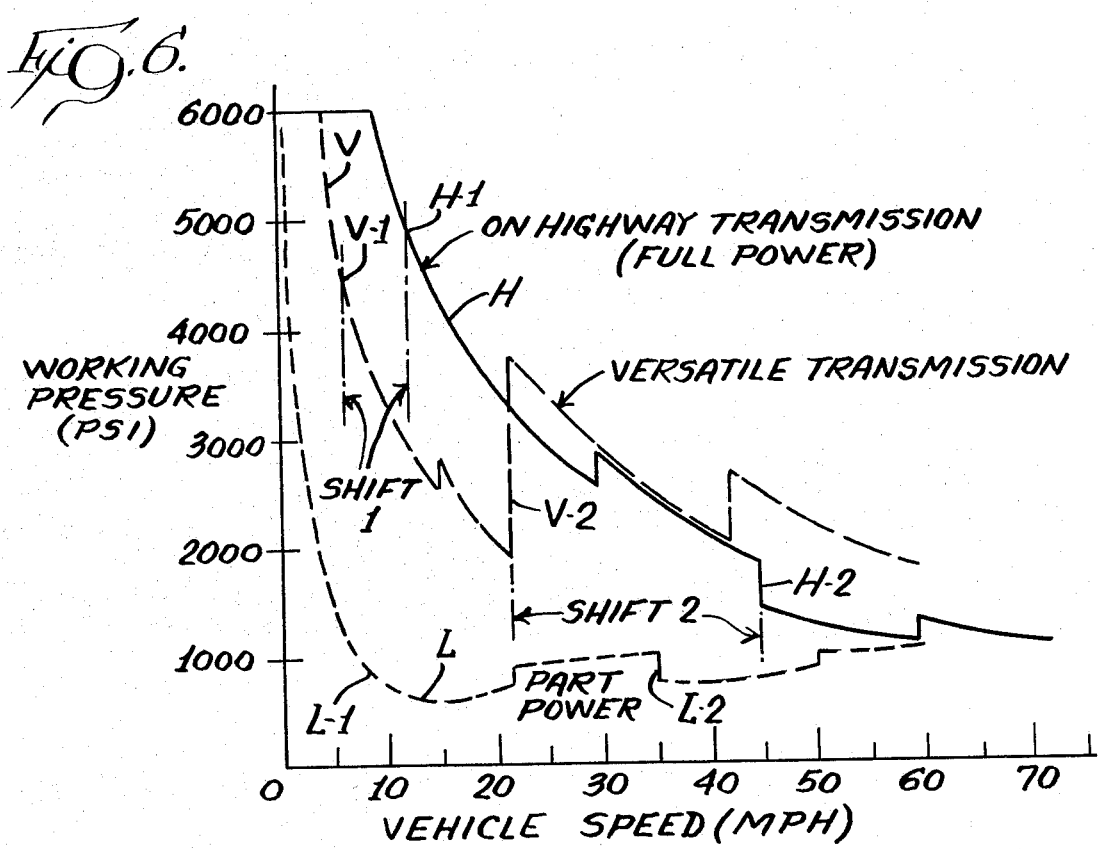
FIG. 6 is a graph of hydrostatic transmission working pressure as related to vehicle speed for the embodiments of FIGS. 1 and 3 and later embodiments to be described.

Additionally, as shown in the graph of FIG. 6, the working pressure in the hydrostatic transmission of the on-highway transmission of the embodiments of FIGS. 1 to 3 is shown in a full line H and assuming full power there is 6,000 p.s.i., as an example, at start-up, with this pressure dropping off with increased vehicle speed and with the shift between modes I and II, just described, occurring approximately at a point H-1 on the line H and it will be noted that the pressure before shift is substantially the same as after the shift. Thus, the condition of the swash plate 35 for the variable displacement unit 25 which determines its displacement and had been equal to the angle of the swash plate 30 before shift will be nearly the same after shift.

The pressures in the hydraulic displacement unit before and after shift are determined by the gear ratios of the planetaries, as are the speed differences between the hydrostatic units before and after shift.

The output speed of the hydromechanical transmission is indicated by the vertical line for ring 43 in the speed diagram of FIG. 5, with the output speed of the ring increasing from 0 to approximately 500 r.p.m.'s in mode I and increasing from 500 to approximately 1800 in mode II as the swash plate 35 moves toward positive displacement for unit 21, as represented by solid line C. In the second mode (mode II) planetary gear set P-2 is used in tandem with planetary gear set P-1 to achieve the required power flows. It is equivalent to a four-element compound in function. After continuing through mode II, the second shift is made with equal speed increments (i.e., speed differences between the hydraulic units 21 and 25) before and after shift as represented by pivoting of line C to the position of dotted line D in FIG. 5 to either side of the 1800 r.p.m. speed line. Line C representing at the right-hand end the speed before shift and line D at the right-hand end the speed after shift. This shift with equal speed increments is in a manner similar to shift between mode I and mode II, previously described. Although the working pressure in the hydrostatic transmission drops slightly after the second shift as indicated at the section H-2 of the line H in FIG. 6, it is not enough to substantially affect leakage as leakage approaches a constant value at lower working pressures. The maximum output speed is indicated by line E of FIG. 5 wherein ring 43 of planetary gear set P-1 approaches 3,000 r.p.m. and with the swash plate 35 moving to a maximum angle for negative displacement of fixed unit 21.

Both power upshifts and downshifts and engine braking upshifts and downshifts can be accomplished in the manner described and with equal swash plate angles of the fixed and variable displacement units, and equal speed increment differences of the fixed displacement unit 21 before and after shift. Past efforts to adjust positive and negative fixed unit speed increments to compensate for unequal working pressure before and after shifts do not accomplish equal angle shifts under conditions of power reversal.

Equal swash plate angle shift for the hydrostatic transmission units can be accomplished faster than equal clutch speed shift in the transmission because full engine power can be used to accomplish the required speed change of the fixed displacement unit 21 as opposed to changing the swash plate position of the variable displacement unit 25 which is moved normally only by a small horsepower pump. Quicker shifts result in a smoother power flow. Also, engine power is absorbed to speed up the fixed displacement unit 21 and, therefore, it does not have as much tendency to overspeed during shifts. Further benefits include reduced hydraulic unit size, since excess swash plate travel for the swash plate 35 of the variable displacement unit 25 does not have to be provided to make up for leakage which would be required when making equal speed shifts. It also facilitates the elimination of synchronous speed sensors which are required for shifting.

A typical transmission cruise condition is represented by broken line F of FIG. 5 wherein output speed is about 2150 r.p.m.'s for ring 43 which is approximately the normal drive shaft speed for line haul trucks. Engine speed, as represented by the speed of ring 48 of planetary gear set P-2 is approximately 1600 r.p.m. which is the most efficient engine speed. The speed of the hydrostatic fixed displacement unit 21, as represented by sun 40, is zero, which is the point of maximum efficiency for the hydrostatic transmission. The relationship of these speeds is determined by the planetary ratio. At the zero speed for the fixed displacement unit 21, the only power transmitted through the hydraulics is that required to make up leakage and overcome frictional losses which are low due to the low working pressure. Mechanical losses are also low at this condition. Neither gear mesh associated with the hydrostatic transmission, including gears 17 and 18 and gears 23 and 50, is transmitting any substantial power nor is planetary gear set P-2 transmitting power. Further, carrier 42 and ring 43 of planetary gear set P-1 have only slightly different speeds and, therefore, the gearing in planetary gear set P-1 transmits less than 25% of engine power at cruise to approach a straight-through transmission.

Additionally, the differential clutch speed can also be observed from FIG. 5. At cruise with approximately 1600 engine r.p.m. each of the inactive clutches, including the clutch associated with brake 60 and clutch 65 are only about 1600 r.p.m. differential and no counter rotation exists which minimizes spinning losses.

Because the transmission is a three-mode device and because of equal angle shifting for the swash plates, the size of the hydraulic units can remain small in relation to the horsepower being transmitted and smaller hydraulics require smaller auxiliary charge and cooling pumps and results in smaller hydraulic unit losses.

The efficiency of the transmission at full power and part power is shown in the graph of FIG. 7. The on-highway transmission at full power is shown by line J and at part power by broken line K. At cruise speeds, this efficiency approximates that obtainable with a standard gear transmission which is a result of the few number of components transmitting only a small fraction of engine horsepower. This provides high durability and reliability, even though there is the capability for immediate ratio change should it be required by road conditions or driver demand.

Figure 4:
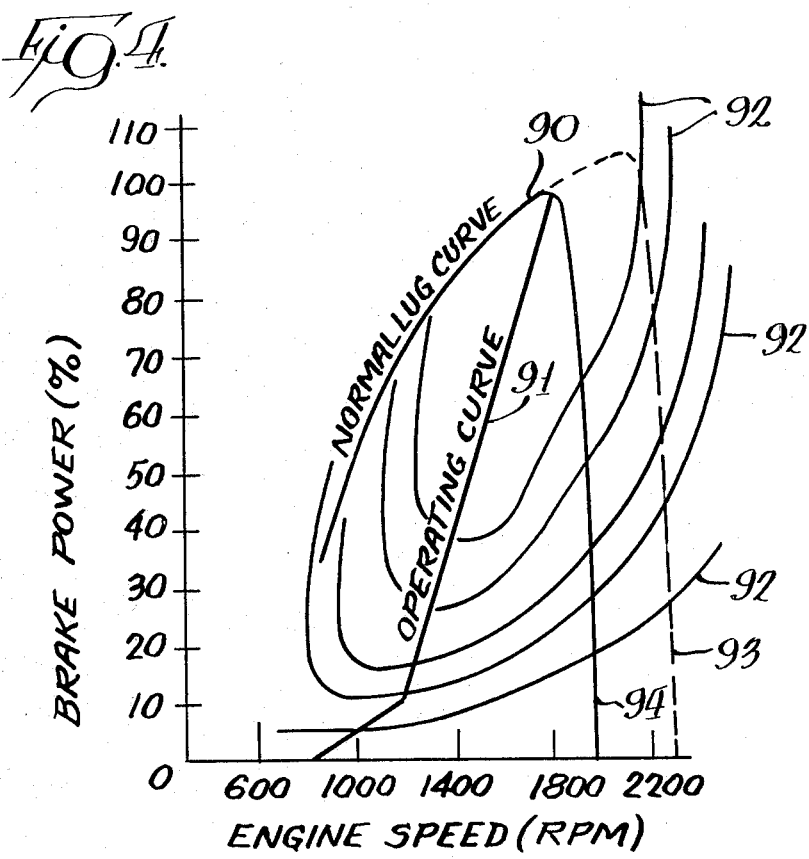
FIG. 4 is a graph showing engine performance characteristics.

The operation of the hydromechanical transmission in the control of fuel to the engine for operation on the locus of minimum fuel consumption is shown in the graph of FIG. 4. A line 90 shows the normal lug curve of an engine, with the operating curve that can be provided with the transmission indicated by an operating curve line 91. A number of lines 92 show various values of fuel consumption at various power and speed levels for the engine, with the innermost line representing the lowest value of fuel consumption. The normal lug curve 90 has a broken line section 93 and the operating curve 91 has a solid line section 94.

As evident from the foregoing, the planetary gear ratios for the two planetary gear sets have been selected to meet three basic considerations which are as follows, in approximate order of importance:

1. Obtain transmission mode shifts which allow a continuous transmission ratio before and after shift;
2. Obtain equal working pressures before and after shifts; and
3. Obtain equal speed differences between the fixed and variable displacement units of the hydrostatic transmission before and after shift and have equal swash plate angles before and after shift.

The transmission disclosed herein has gear ratios which satisfy all of the foregoing considerations. In describing the gear ratios, the planetary speed diagram of FIG. 5 has had certain gear ratios defined with the ratio between the sun gear 40 and the carrier 42 of planetary gear set P-1 being identified by the gear ratio Y and the gear ratio between the sun gear 45 and carrier 47 of planetary gear set P-2 being identified at X. The remaining ratios are identified as "1". In order to have a continuous transmission ratio before and after shift, with a four-element transmission as disclosed herein, the gear ratios must be in the following relation:
$X = Y - 1$.

In order to obtain equal working pressure shifts, hydraulic horsepower before and after shift must be equal. As derived from power flows, hydraulic horsepower can be expressed as a function of input horsepower, as follows:

For the hydrostatic mode:

$HPhyd = HPin$.

For the hydromechanical modes:

(a) Start of mode: $HPhyd = HPin \dfrac{R-1}{2} (Etr)$ (b) End of mode: $HPhyd = HPin \dfrac{R-1}{2R} (Etr)$ where $R = \dfrac{\text{max output speed of mode}}{\text{min output speed of mode}}$ $Etr$ = transmission efficiency For this transmission in mode II, $R = \dfrac{Y}{Ev}$ where Ev equals hydraulic log volumetric efficiency. After shift from mode I to Mode II, Ev equals 0.85 and Etr equals 0.72. Since HPhyd after shift should equal input HP, Y equals 3.3 in order to obtain equal working pressure before and after shift and this condition is met.

Prior to the shift from mode II to mode III, Etr is 0.93; therefore, HPhyd equals 0.32 HPin before shift, then R=1.7 in order to obtain equal working pressure before and after shift. However, R in mode III is also dependent on the ratio selected for the first two modes because of the geometry and mechanics:

$$R \text{ (mode III)} = \dfrac{2+Y}{Y\,Ev}$$

After shift into mode III, Ev is 0.93. Therefore, R for mode III is approximately 1.7 which is the required value for equal working pressure.

From geometry considerations, for an exactly equal speed change from mode I to mode II:

$$X = \dfrac{Y+1}{Y-1}$$

With Y equalling 3.3, X should equal 1.9. It actually is 2.3. However, this difference results in less than 4% error in swash plate position, which can be readily accommodated.

For an exactly equal angle speed change from mode II to mode III, the following applies:

$$Y = \dfrac{X+1}{X-1}$$

Since X equals 2.3, Y should equal 2.5; however, as stated previously, Y is 3.3 and, thus, this results in a very small swash plate error of about 1% for this shift.

The horizontal spacing of the four vertical lines in the planetary speed diagram of FIG. 5 gives the desired gear ratios and the gearing shown in FIG. 1 represents one embodiment of gearing to obtain the desired gear ratios. An alternative embodiment could provide the same results wherein, in FIG. 5, carrier 42 of planetary gear set P-1 is moved into alignment with carrier 47 of planetary gear set P-2 and ring 43 of planetary gear set P-1 is moved into alignment with sun 45 of planetary gear set P-2.

The operation of the transmission is believed evident from examination of the planetary speed diagram of FIG. 5 wherein, on start-up, the sun gear 40 increases in speed in a negative direction from zero with the output ring 43 increasing in speed, as indicated by the solid line A, with the speed of the elements immediately after shift 1 being shown by dotted line B, and with mode 2 being represented by the change from line B to solid line C where the output ring 43 increases in speed. In shift 2 from mode II to mode III, the speed of the elements changes from line C to dotted line D at the opposite side of the 1800 engine r.p.m. level and with mode III occurring from dotted line D to the solid line E, as indicated by the identified arrow and with the speed of ring 43 further increasing.

The working pressure within the hydrostatic transmission at part power operation is shown in broken line as the lowermost line in FIG. 6, identified at L, with the shift from modes I to II occurring approximately at location L-1 and the shift from mode II to mode III occurring approximately at location L-2. It will be evident from the foregoing that the planetary gear sets P-1 and P-2 form a four-element compound in function, with the gear ratios as shown in FIG. 5, with the ratio between the sun gear and carrier of planetary gear set P-1 being Y and the gear ratio of the sun gear and carrier of planetary P-2 being X. The additional two elements are provided by interconnection of the carrier and ring of planetary gear set P-1 and the carrier and ring of planetary gear set P-2, with the gear ratios between these two pairs each being 1.

An alternate embodiment of the hydromechanical transmission having the characteristics of the embodiment of FIG. 1 is shown in FIG. 3. This alternate embodiment represents an in-line version of the components as compared to the embodiment of FIG. 1 wherein the hydrostatic transmission provides an offset hydraulic log. In this embodiment of FIG. 3, structural elements the same as those shown in FIG. 1 are given the same reference numeral with a prime affixed thereto.

In this embodiment, the output from the fixed displacement unit 21' is by way of a tubular shaft 100 which carries the sun gear 40' of planetary gear set P-1'. The input shaft 11' is connected directly to the variable displacement unit 25', with an extension 101 of the input shaft extending beyond the variable displacement unit and through the tubular shaft 100 for connection to a clutch member 102 comparable to the clutch sleeve 16 of the embodiment of FIG. 1 and which carries the clutch plates 64' and 66' of the clutches 63' and 65', respectively.

It will be noted that a primary difference in the embodiment of FIG. 3 is in the coaxial relation of the tubular shaft 100 and the input shaft extension 101 and with the reversal of the positions of the planetaries. The operations of the brake means 61' and clutches 63' and 65' in the three modes, as well as the various functional results obtained, are the same as described in connection with the embodiment of FIG. 1.

A third embodiment of the hydromechanical transmission is shown in FIG. 8 and has several differences over the embodiments of FIGS. 1 and 3. FIGS. 1 and 3 relate to a hydromechanical transmission primarily suitable for line haul trucks and has been referred to as an "on-highway" transmission. The embodiment of FIG. 8, as well as the embodiment of FIG. 14 to be described, relate to a versatile transmission having three planetary gear sets providing the three modes of operation described in connection with the previous embodiments and with an extended third mode wherein the hydraulic log provides a greater speed range. The versatile transmission is easily adapted to various specific requirements of general vehicle application and, particularly, to vehicles requiring a broad band of output speed ratios and horsepower ranges and which frequently require extraordinary performance specifications, such as higher output torque, increased frequency of starting cycles, extended operation at high output torque and high horsepower levels or requirements for lower noise levels. Examples of such vehicles are transit mixers, buses, dump trucks or refuse haulers. Additionally, the transmission has the hydrostatic transmission operating at a lower pressure at low ground speeds, such as when accelerating or climbing a hill under load, to increase the efficiency with resulting lessened power loss, cooling requirements and noise generation. The operation at lower pressure also increases transmission life when the vehicle has an unusually high number of starts, such as a bus.

The transmission includes a hydrostatic transmission, indicated generally at 200, of the same construction as the hydrostatic transmission 20 of FIG. 1, having a fixed hydraulic displacement unit 201 and a variable displacement hydraulic unit 202, with the strokes of the pistons controlled by a fixed swash plate 203 and a movable swash plate 204, respectively.

The input shaft 210 carries an input spur gear 211 with the teeth thereof meshing with teeth on a rotatable clutch sleeve 212 having an external gear 215 which meshes with gear 216 carried by drive shaft 217 for the variable displacement unit 202.

Three primary planetary gear sets include a planetary gear set P-4, a planetary gear set P-5, and a planetary gear set P-6. An additional planetary gear set P-7 provides a speed reduction to an output shaft 220 for the transmission. The planetary gear set P-4 has a ring gear 221 meshing with planet gears 222 carried on a carrier 223 and with the planet gears meshing with a sun gear 224 carried by a tubular member 225 having a gear 226 which meshes with a gear 227 carried by an output shaft 228 from the fixed displacement unit 201. The ring gear 221 of the planetary gear set P-4 is carried by a sleeve 230 which connects by shaft 231 to a carrier 232 of the planetary gear set P-5. Carrier 232 of planetary gear set P-5 has planet gears 233, which mesh with a ring gear 234 and also with a sun gear 235.

Planetary gear set P-6 has ring gear 240 which meshes with planet gears 241 on a carrier 242 with the planet gears meshing with a sun gear 243.

A brake means, indicated generally at 250, includes a selectively operable clutch with clutch plates 251 connected to a sleeve 252 which connects to the carrier 223 of the planetary gear set P-4, the ring gear 234 of the planetary gear set P-5 and the carrier 242 of the planetary gear set P-6.

A clutch, indicated generally at 260, has clutch plates 261 carried by the clutch sleeve 212 for selective engagement with clutch plates 262 mounted on a shaft 263 which mounts the sun gear 235 of planetary gear set P-5 and the sun gear 243 of the planetary gear set P-6. A clutch 270 has clutch plates 271 carried by the clutch sleeve 212 which selectively engage clutch plates 272 carried on a tubular member 273 surrounding the shaft 263 and which mounts the ring gear 240 of the planetary gear set P-6.

The output of the planetary gear assembly is delivered by the sleeve 230 to a ring gear 280 of planetary gear set P-7 which meshes with planet gears 281 mounted on a carrier 282 connected to the output shaft 220. The planet gears 281 mesh with a sun gear 283 held in fixed position.

Figure 13:
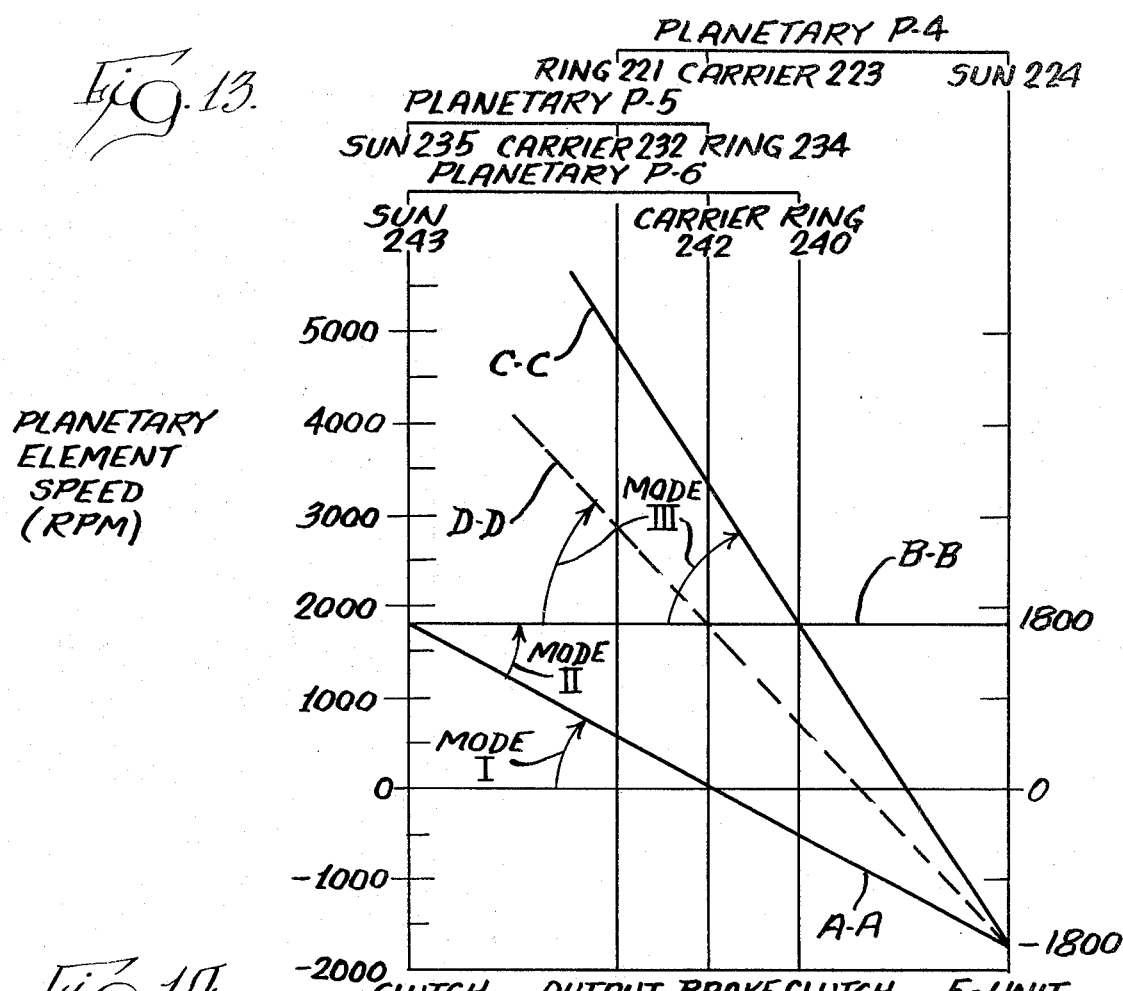
FIG. 13 is a planetary speed diagram for the hydromechanical transmission embodiments of FIGS. 8 and 14.

The operation of the transmission of FIG. 8 is shown in the planetary speed diagram of FIG. 13 and, for clarity, planetary element speeds are shown assuming no volumetric loss in the hydrostatic transmission and assuming an engine speed of 1800 r.p.m.'s.

At start-up in mode I, the clutch associated with the brake 250 is engaged, which grounds carrier 223 of planetary gear set P-4 and stroking the swash plate 204 of the variable displacement unit 202 to produce negative rotation of the fixed displacement unit 201 produces positive rotation of ring 221 which is the output member to drive the output shaft 220 through the planetary gear set P-7. This operation is shown by the line A—A in FIG. 13 and identified by the arrow MODE I. At the end of mode I, it will be noted that the speed of sun gear 235 of planetary P-5 is operating at engine speed and clutch 260 is engaged and the brake 250 released to shift into mode II without changing output speed or engine speed. De-stroking the swash plate 204 of the variable displacement unit 202 now causes a reduction of negative speed of the fixed displacement unit 201 which produces increased output speed as planetary gear set P-5 and P-6 act in tandem. This range of operation is indicated between line A—A in the graph of FIG. 13 and the line B—B, with the range being indicated by the arrow identified as MODE II. This further increases the speed of the output ring gear 221 of the planetary gear set P-4. The line B—B indicates all members of the planetaries are rotating at the same speed, which is the input speed from the engine when the fixed displacement unit 201 reaches full rated speed. At this point, clutch 270 is engaged and the clutch 260 disengaged, without changing engine speed or output speed. Destroking the swash plate 204 of the variable displacement unit through zero and to the opposite direction causes output speed to reach its maximum value, which is shown by a line C—C in FIG. 13 and represents an operation in mode III, indicated by the identified arrow from the line B—B to line C—C. During mode III, all three planetary gear sets are operating in tandem.

The versatile transmission of FIG. 8 obtains mode shifts which allow a continuous transmission ratio before and after shift. Additionally, this transmission in shifting from mode I to mode II provides for equal working pressures and equal speed differences before and after shifts. In the embodiment of FIG. 8, in shifting between mode II and mode III, a pressure differential exists before and after shift and the unit speed increment of the fixed displacement unit 201 is not equal. This requires a small swash plate movement on engine-powering shifts, but not on engine-braking shifts.

The shift between mode II and mode III will not be as smooth as the shift between mode I and mode II during conditions of engine powering, but would be smoother than shifts made with equal unit speeds of the fixed displacement unit 201 before and after shift because the required swash plate movement for the shift between mode I and mode II will be only about one-third that required for the second shift between mode II and III.

In the graph of FIG. 13, it will be observed that by making small changes in the ratio of planetary gear set P-6 that relatively larger changes in maximum output speed will be obtained. This is accomplished without changing any other components and without sacrificing synchronous mode shift. This provides some degree of versatility. Also, it wll be noted that the maximum output speed in mode III (line C—C) is higher than is normally used on heavy duty truck drive shafts. For this reason, an output gear reduction is shown in the form of planetary gear set P-7 and this planetary gear set can be changed in ratio to accommodate various maximum output speed requirements. An alternative configuration (not shown) could be a transfer gear train in order to facilitate the flow of power underneath the transmission to a front-mounted drive axle.

The over-all torqur ratio speed of the transmission shown in FIG. 8 has been increased substantially when compared to the transmission embodiments of FIGS. 1 and 3 because of the third mode extension with the hydrostatic log operating over a greater speed range. Line C—C of FIG. 13 shows the maximum transmission output speed for the embodiment of FIG. 8, with a broken line D—D showing the maximum output speed for the embodiments of FIGS. 1 and 3. The torque ratio increase is noted by observing that if the maximum output speed, which is indicated by line C—C of FIG. 13 were reduced to the maximum speed of line D—D by a simple gear reduction, then the maximum torque at start-up would have been increased by that ratio. Additionally, this torque ratio increase can be modified by changing the gear ratio of planetary gear set P-6. The planetary gear set P-7 gives the gear reduction referred to above for reducing the maximum output speed to increase the maximum torque at start-up.

The increase in torque ratio provides several advantages. Some types of vehicles, such as off-highway trucks, require increased tractive effort in order to climb steep grades or operate on poor terrain under heavily loaded conditions, with the torque ratio increase providing the increase in vehicle tractive effort. The vehicle still needs to maintain the ability to use highway speeds when travelling to and from work sites. Because of the extended third mode of the transmission in FIG. 8, the undesirable high pressure and low efficiency operation of the hydrostatic transmission are moved to a vehicle speed low enough so as to make them unimportant for loss of power or heat rejection considerations. This shift is shown in the graph of FIG. 6 wherein a broken line V shows the working pressure-vehicle speed relation for the versatile transmission and it will be noted that the maximum working pressure drops off at a lower vehicle speed for the versatile transmission than the on-highway transmission. The shift between mode I and mode II is indicated at V-1 and the shift between modes II and III is indicated by the section V-2 of the line V.

Low heat rejection and power loss are important for vehicles which must spend anything more than an minimal amount of time at low ground speed and high horsepower levels. This condition cannot be insured for hydromechanical transmissions with standard torque ratio spreads used with auxiliary transmissions because the low auxiliary ratio might not be used consistently. Additionally, an auxiliary transmission can add expense and complexity to the system and does not consistently use the hydromechanical transmission to its best advantage because the auxiliary transmission requires a non-automatic ratio change and may not provide the best operational characteristics.

The increased torque ratio spread also adds versatility to the transmission. In some applications, such as a city bus, a substantially large number of vehicle starts may be required and this could reduce the life of the transmission if operated at normal pressures. The transmission can be operated at reduced starting pressure and still maintain the normal torque ratio spread. Even if pressures are not reduced, the starting life would be increased because cumulative time at high pressure is reduced, due to the shorter time required to accelerate out of the high pressure speed zone.

Some vehicles may also require reduced noise level and, again, the example of a city bus is appropriate. It is known that noise can be reduced by reducing speed and this is particularly true for hydraulic units. Because of the extended third mode of operation and the input gearing, to be described, it is possible to reduce the rate of speed of all the transmission components at the same rated engine speed and still obtain a normal torque ratio spread thereby reducing transmission noise.

This versatility is obtained with some sacrifice in efficiency at high output speeds and some loss in reliability because of the increased number of components transmitting power. This is not of great significance for vehicles normally utilizing the versatile transmission of FIG. 8, since the average vehicle speeds are usually in the order of 15 to 25 m.p.h.

The output gearing for the transmission of FIG. 8 which enables reduction in rated speed of all the transmission components at the same rated engine speed is shown particularly in FIGS. 9 to 12 and includes structure relating to the interchangeability of the input spur gear 211. A transmission housing is indicated generally at 300 with a housing cover 301 secured to the housing 300 by a series of fastening means 302. The housing cover 301 has an eccentric guide section 312 which rotatably mounts the input shaft 210. The centerline of the ring gears of the planetaries is indicated by a broken line 305 and it is noted that in FIGS. 9 and 10 the axis of the input shaft 210 is offset from the ring gear centerline. The housing cover 301 is piloted on the housing 300 by the engagement of cover flanges 310 with the interior of the housing 300 whereby a center 311 of the housing cover 301 is always above the ring gear centerline 305. Assuming the engine is a 2100 r.p.m. engine, then the input spur gear 211, shown in FIGS. 9 and 10, is used with the housing cover positioned to have the mesh between the input spur gear 211 and the gear 212.

For a higher rated engine, as for example a 2600 r.p.m. engine, the input spur gear is of a different size, as shown for the input spur gear 320 in FIG. 12 which is used in place of the input spur gear 211 in FIG. 10. With the differing diameter of the input spur gear 320, the housing cover 301 is rotated to shift the eccentric guide section 312 for the input shaft 210 relative to the ring gear centerline 305 to accommodate the different diameter of the input spur gear. This relocates the centerline of the input shaft 210 between the two positions shown in FIGS. 9 and 11 to either side of the ring gear centerline 305. With this structure, relatively large speed ratio changes can be accomplished with a relatively small variation between input and output centerlines and with only the change of the one input spur gear. A further advantage of this construction is that the input ratio may be determined by observing the location of the cover housing 301 which helps to locate assembly or labelling errors. It will be seen that the housing cover 301 can be rotated to various positions between those shown in FIGS. 9 and 11 to accommodate spur gears of other diameters.

The efficiency of the transmission of FIG. 8 is shown in the graph of FIG. 7 by a broken line identified at V—V.

Figure 14:
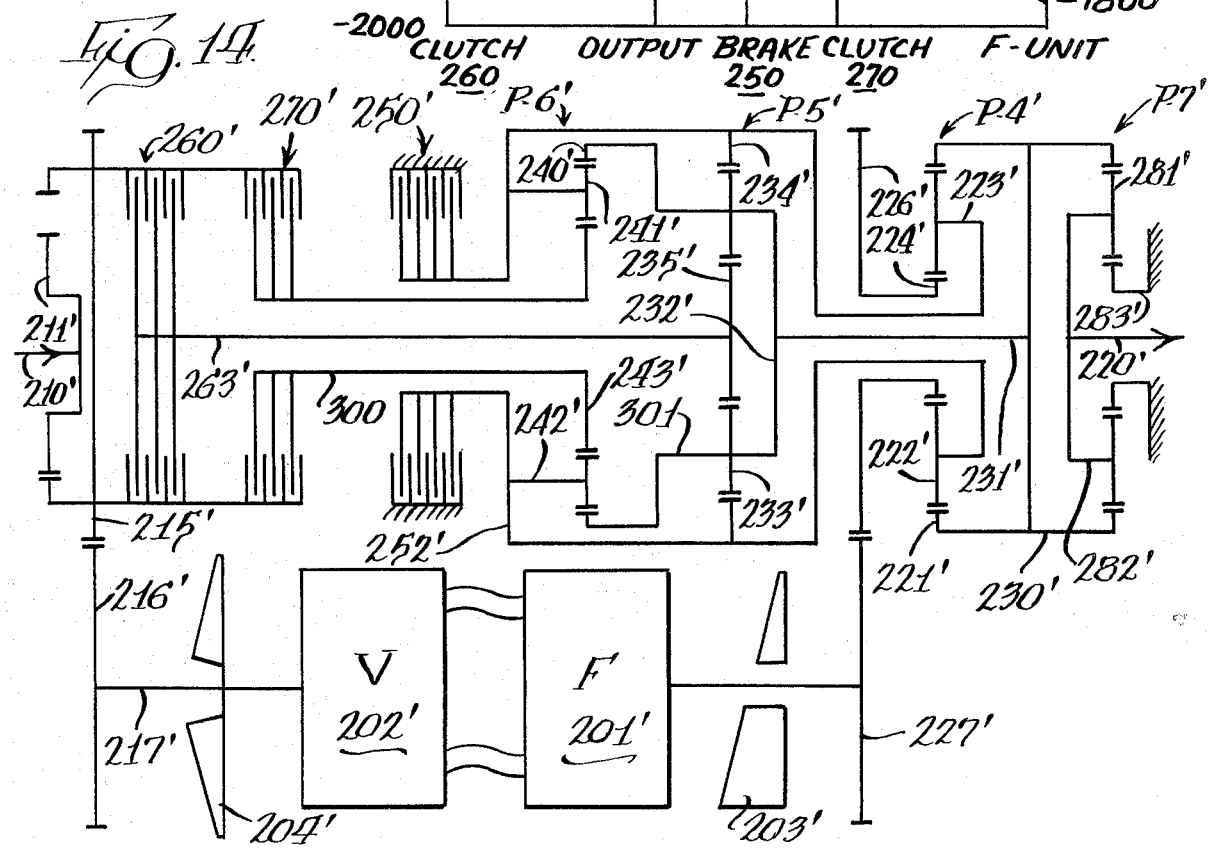
FIG. 14 is a schematic stick diagram of an alternate embodiment of the hydromechanical transmission of FIG. 8 with an extended third range of operation.

FIG. 14 shows an alternate construction for a three-planetary hydromechanical transmission having the extended third mode, with the same parts as used in the embodiment of FIG. 8 being given the same reference numerals with a prime affixed thereto.

In the embodiment of FIG. 14, only planetary gear sets P-4' and P-6' are operating in tandem in mode III. The speed diagram for the transmission is similar to FIG. 13, except that planetary gear set P-6' is connected to different power members than planetary gear set P-6. Specifically, the sun gear 243' of planetary gear set P-6' is connected to the clutch 270', rather than to the clutch 260', as in the embodiment of FIG. 8, with this connection being by a tubular member 300. The ring gear 240', instead of being driven by a clutch, is connected to the carrier 232' of planetary gear set P-5' by an interconnecting member 301 and, thus, the ring gear 240' is connected not only to the carrier of planetary gear set P-5' but also to the ring gear of planetary gear set P-4'. The carrier 242' of planetary gear set P-6' is connected to the tubular member 252' extending from the brake means 250' wherein the carrier is subject to the action of the brake along with the ring gear 234' of planetary gear set P-5' and the carrier 223' of planetary gear set P-4'.

In the embodiments of FIGS. 8 and 14, the hydromechanical transmissions are of the same basic nature being a three-mode synchronous shift system with a three planetary gear system operating in tandem to achieve a five-element summer and with there being an extended third mode of operation with the hydrostatic transmission being operable over a greater speed range.

I claim:

1. A hydromechanical transmission having plural modes of operation with a shift between modes maintaining the power load on a power source for the transmission comprising, an output shaft, a planetary gear system including an element thereof providing a drive to said output shaft, an input shaft connectable to the power source, a hydrostatic transmission connectable to said power source and offset from the axis of said input and output shafts, said hydrostatic transmission including a pair of hydraulic units each with a displacement setting swash plate and with the angle of one of the swash plates being variable and with one unit connectable to the power source and the other unit connected to a first rotatable element of the planetary gear system, each of the units operating as either a pump or a motor at different times with the flow from the pump unit being greater than that flowing through the motor unit because of leakage which requires a larger displacement for the unit operating as a pump, means for hydraulically driving said first rotatable element of the planetary gear system from the hydrostatic transmission without direct mechanical connection to the input shaft in one mode of operation and with the hydrostatic transmission units capable of delivering full power provided by the power source, means for connecting both the hydrostatic transmission and the input shaft to the planetary gear system in a second mode of operation including a clutch between said input shaft and a second rotatable element of said planetary gear system, the unit functioning as a pump having a greater flow than the other unit at the end of said one mode and immediately prior to shift to said second mode in order to make up leakage, and means including gear ratios in the planetary gear system for maintaining a continuous transmission ratio and power flow through a mode shift with each hydraulic unit having its same displacement setting before and after shift including gearing means in said planetary gear system drivingly interconnecting said first and second rotatable elements to maintain a fixed speed relation therebetween during various speeds of operation in said one mode when said first element is free to rotate because of said clutch being disengaged, additional gearing means in said planetary gear system operative upon engagement of said clutch to convert a speed change in said first rotatable element to an increased speed of said second rotatable element whereby said second rotatable element can rotate at a greater speed after shift than before shift whereby said other unit operating as a pump after shift has an effectively larger flow after said shift to make up leakage and avoid the need for movement of the variable swash plate, said gearing means having gear ratios to provide substantially equal working pressure in and substantially equal speed differences between said units before and after shift between modes.

2. A hydromechanical transmission having first, second and third planetary gear sets each with a sun gear, a ring gear and a carrier with planet gears, an input shaft connectable to a power source, an output shaft operatively connected to the ring gear of the first planetary gear set, a hydrostatic transmission driven by the input shaft and having a pair of hydraulic displacement units with angled displacement controlling swash plates and with at least one swash plate being movable to positions either side of center to provide variable and reversible displacement, one of said units being connected to the sun gear of said first planetary gear set, a selectively operable brake connected to the carrier of said first planetary gear set and engageable in a first mode of operation to provide a hydrostatic drive for said output shaft, a first drive line from said input shaft to a sun gear of the second planetary gear set including a first selectively-engageable clutch and engageable for a second mode of operation with said brake disengaged, a second drive line from said input shaft to the ring gear of the third planetary gear set including a second selectively-engageable clutch and engageable for a third mode of operation with said brake and first clutch disengaged, said carrier and said ring gear of said first planetary gear set being connected for rotation with the ring gear and carrier, respectively, of the second planetary gear set, and the gear ratios of said planetary gear sets being related whereby the second mode of operation results from disengagement of the brake and engagement of the first clutch with equal working pressure in said hydraulic units before and after shift and the third mode results from disengagement of the first clutch and engagement of the second clutch.

3. A hydromechanical transmission as defined in claim 2 wherein said hydrostatic transmission is off-set from the centerline of the ring gears of said planetary gear sets, gear means including a gear on the input shaft for interconnecting said input shaft and one of said hydraulic displacement units, and means mounting said input shaft for variable positioning relative to said centerline to accommodate differing diameters of said one gear whereby said transmission may accommodate various rated engine speeds.

4. A hydromechanical transmission as defined in claim 3 including a housing for said transmission, and a housing cover carrying said input shaft eccentrically of said ring gear centerline and rotatably mountable to the housing.

5. A hydromechanical transmission as defined in claim 2 wherein said first drive line is additionally connected to the sun gear of the third planetary gear set, and said brake is also connected to the ring gear of the second planetary gear set and the carrier of the third planetary gear set.

6. A hydromechanical transmission having first, second and third planetary gear sets each with a sun gear, a ring gear and a carrier with planet gears, an input shaft connectable to a power source, an output shaft operatively connected to one of the gears of the first planetary gear set, a hydrostatic transmission driven by the input shaft and having a pair of hydraulic displacement units with angled displacement controlling swash plates and with at least one swash plate being movable to positions either side of center to provide variable and reversible displacement, one of said units being connected to a second gear of said first planetary gear set, a selectively operable brake connected to a third gear of said first planetary gear set and engageable in a first mode of operation to provide a hydrostatic drive for said output shaft, a first drive line from said input shaft to one of the gears of the second planetary gear set including a first selectively-engageable clutch and engageable for a second mode of operation with said brake disengaged, a second drive line from said input shaft to one of the gears of the third planetary gear set including a second selectively-engageable clutch and engageable for a third mode of operation with said brake and first clutch disengaged, two of the gears of said first planetary gear set being connected for rotation with two of the gears of the secondary planetary gear set, and the gear ratios of said planetary gear sets being related whereby the second mode of operation results from disengagement of the brake and engagement of the first clutch with equal working pressure in said hydraulic units before and after shift and the third mode results from disengagement of the first clutch and engagement of the second clutch.

* * * * *